United States Patent
Lei et al.

(10) Patent No.: US 10,728,772 B2
(45) Date of Patent: *Jul. 28, 2020

(54) SYSTEM AND METHOD FOR MANAGING DUAL CONNECTIVITY WITH DYNAMIC ANCHOR CELL SELECTION

(71) Applicant: AT&T Intellectual Property I, L.P., Atlanta, GA (US)

(72) Inventors: Hongyan Lei, Plano, TX (US); Zhi Cui, Sugar Hill, GA (US); Yonghui Tong, Alpharetta, GA (US); Yung Choi-Grogan, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/736,480

(22) Filed: Jan. 7, 2020

(65) Prior Publication Data

US 2020/0145840 A1 May 7, 2020

Related U.S. Application Data

(63) Continuation of application No. 16/443,015, filed on Jun. 17, 2019, now Pat. No. 10,555,187, which is a
(Continued)

(51) Int. Cl.
*H04W 16/32* (2009.01)
*H04L 12/24* (2006.01)
(Continued)

(52) U.S. Cl.
CPC ........... *H04W 16/32* (2013.01); *H04L 41/082* (2013.01); *H04W 36/0069* (2018.08);
(Continued)

(58) Field of Classification Search
CPC ..... H04W 16/32; H04W 88/06; H04W 88/08; H04W 36/0069; H04W 36/00835; H04W 72/085; H04W 76/16; H04L 41/082
(Continued)

(56) References Cited

U.S. PATENT DOCUMENTS

| | | | | |
|---|---|---|---|---|
| 2014/0192740 | A1* | 7/2014 | Ekpenyong | ........... H04L 5/0094 370/329 |
| 2014/0286243 | A1* | 9/2014 | Yamada | .............. H04W 72/042 370/329 |

(Continued)

FOREIGN PATENT DOCUMENTS

| | | |
|---|---|---|
| WO | 2014120077 A1 | 8/2014 |
| WO | 2016119210 A1 | 8/2016 |

(Continued)

OTHER PUBLICATIONS

New Radio Access Technology in 3GPP, downloaded from the Internet at http://std-share.itri.org.tw/Content/Files/Event/Files/2.%/20New%20Radio%20Access%20%20Technology%20in%203GPP.pdf, 2016, 1-45.
(Continued)

*Primary Examiner* — William Nealon
(74) *Attorney, Agent, or Firm* — Guntin & Gust, PLC; Robert Gingher

(57) ABSTRACT

Aspects of the subject disclosure may include, for example, obtaining configuration update messages received from neighbor cells of a serving cell of a wireless network, wherein the configuration update messages include dual connectivity capability information of the neighbor cells. The neighbor cells are ranked according to the dual connectivity capability information resulting in a dual connectivity ranking. A target cell of the neighbor cells is selected according to the dual connectivity ranking and a dual connectivity capability of a mobile device, and a dual
(Continued)

300 connectivity service is established according to the dual connectivity ranking. The dual connectivity service includes exchanging user plane messages between the mobile device, a master cell and a secondary cell of the wireless network. Other embodiments are disclosed.

20 Claims, 9 Drawing Sheets

Related U.S. Application Data continuation of application No. 15/658,625, filed on Jul. 25, 2017, now Pat. No. 10,368,253.

(51) Int. Cl.
    *H04W 36/00*      (2009.01)
    *H04W 88/08*      (2009.01)
    *H04W 72/08*      (2009.01)
    *H04W 76/16*      (2018.01)
    *H04W 88/06*      (2009.01)

(52) U.S. Cl.
    CPC .... *H04W 72/085* (2013.01); *H04W 36/00835* (2018.08); *H04W 76/16* (2018.02); *H04W 88/06* (2013.01); *H04W 88/08* (2013.01)

(58) Field of Classification Search
    USPC ........................................................ 370/329
    See application file for complete search history.

(56) References Cited

U.S. PATENT DOCUMENTS

| | | | |
|---|---|---|---|
| 2015/0043492 A1* | 2/2015 | Baek | H04W 76/15 370/329 |
| 2015/0092707 A1* | 4/2015 | Kwon | H04L 5/001 370/329 |
| 2015/0124748 A1* | 5/2015 | Park | H04L 5/0032 370/329 |
| 2015/0312947 A1* | 10/2015 | Park | H04M 1/725 370/329 |
| 2016/0014836 A1* | 1/2016 | Pinheiro | H04L 5/0051 370/329 |
| 2016/0029362 A1* | 1/2016 | Kim | H04L 5/0048 370/329 |
| 2016/0095004 A1* | 3/2016 | Tseng | H04W 48/00 370/228 |
| 2016/0353457 A1* | 12/2016 | Park | H04B 7/024 |
| 2017/0019936 A1* | 1/2017 | Ohseki | H04W 76/10 |
| 2017/0150384 A1* | 5/2017 | Rune | H04W 36/0088 |
| 2017/0188259 A1 | 6/2017 | Van Phan et al. | |
| 2017/0195935 A1* | 7/2017 | Xu | H04W 36/0055 |
| 2017/0237535 A1* | 8/2017 | Park | H04B 7/0478 370/329 |
| 2017/0366313 A1* | 12/2017 | Rahman | H04W 76/15 |
| 2018/0220336 A1* | 8/2018 | Hong | H04W 36/00837 |
| 2019/0037417 A1 | 1/2019 | Lei et al. | |
| 2019/0306728 A1 | 10/2019 | Lei et al. | |

FOREIGN PATENT DOCUMENTS

| | | |
|---|---|---|
| WO | 2016169801 A1 | 10/2016 |
| WO | 2016195735 A1 | 12/2016 |
| WO | 2017062244 A1 | 4/2017 |

OTHER PUBLICATIONS

Ravanshid, Azad et al., Ravanshid, Azad, et al. "Multi-connectivity functional architectures in 5G." Communications Workshops (ICC), 2016 IEEE International Conference on. IEEE., 2016, 1-7.

Zhang, Hongtao et al., "Performance evaluation for local anchor-based dual connectivity in 5G user-centric network." IEEE Access 4., 2016, 5721-5729.

Zhang, Jian et al., LTE Small Cell Enhancement by Dual Connectivity, downloaded from the internet at http://www.wwrf.ch/files/wwrf/content/files/publications/outlook/Outlook15.pdf, 2014, 1-22.

* cited by examiner

100

|  Neighbor Relation | | Neighbor Relation Attributes | | | |
| --- | --- | --- | --- | --- | --- |
| NR | TCI | No Remove | No HO | No X2 | LTE-5G NR DC Preference |
| 1 | TCI#1 | | | | Preferred |
| 2 | TCI#1 | √ | | √ | No support |
| 3 | TCI#1 | √ | | | Fallback |
| | | | | | |

302  304  306  308  310  312

300

400

500

550

600

700

SYSTEM AND METHOD FOR MANAGING DUAL CONNECTIVITY WITH DYNAMIC ANCHOR CELL SELECTION

CROSS REFERENCE TO RELATED APPLICATIONS

This application is a continuation of U.S. application Ser. No. 16/443,015, filed Jun. 17, 2019, which is a continuation of U.S. application Ser. No. 15/658,625, filed on Jul. 25, 2017 (now U.S. Pat. No. 10,368,253), which are incorporated herein by reference in their entirety.

FIELD OF THE DISCLOSURE

The subject disclosure relates to a system and method for managing dual connectivity with dynamic anchor cell selection.

BACKGROUND

Dual connectivity (DC) within a wireless mobile scenario, allows mobile user equipment to exchange user data simultaneously with more than one different base stations. For example, in $3^{rd}$ Generation Partnership Project (3GPP) Long Term Evolution (LTE) networks, the mobile user equipment can be configured to support mobile operation of similar or different kinds. For example, mobile user equipment configured to support both LTE and Wi-Fi, or both LTE and 5G New Radio (NR), or any combination of LTE, 5G NR, Wi-Fi, or the like, may be configured by the network to utilize more than one of these links simultaneously.

Beneficially, DC can significantly improve per-user throughput and mobility robustness by allowing the mobile user equipment to be connected simultaneously to a master cell group and a secondary cell group, e.g., via a Master eNodeB (MeNB) and a secondary eNB (SeNB). The increase in per-user throughput can be achieved by aggregating radio resources from at least two eNBs. In at least some applications, coordination between participating base stations, e.g., the MeNBs and SeNBs in support of DC operation, can be achieved over existing interfaces, such as the 3GPP LTE Xn/X2 interface. More generally, DC can be achieved using different wireless access points having the same or different capabilities, such as eNBs, NodeBs, Wi-Fi, and the like.

As mobile networks evolve towards future trends, such as 3GPP 5G NR (New Radio) capabilities, it is envisioned that introduction will start with geographically limited 5G coverage, e.g., hot spots, to support high throughput using 5G, while relying on the legacy LTE network to provide an underlay coverage and reliability. In all likelihood, LTE networks will co-exist with 5G for a long time. In early stage of 5G NR deployment, 5G NR may be connected to or otherwise in communication with an LTE core system. It is conceivable that in later stages of deployment, LTE cells could be migrated to 5G Next Generation Core (NGC). In either case, UE with LTE and 5G capabilities, e.g., multiple radios, maintains single control plane (CP) connection to the mobility core network, and single or dual User Plane (UP) connection to the mobility core network.

LTE-5G NR Dual Connectivity enables new UE to connect to both LTE and 5G—achieve high throughput via 5G NR and maintain the coverage and reliability by anchoring the signaling (control plane) in LTE. DC can also minimize control plane signaling load to the core network. With the network evolving to 5G, the surrounding LTE macro cells can be of various conditions—some are suitable to be LTE anchor cell for DC, some are not.

BRIEF DESCRIPTION OF THE DRAWINGS

Reference will now be made to the accompanying drawings, which are not necessarily drawn to scale, and wherein.

DETAILED DESCRIPTION

Figure 1:
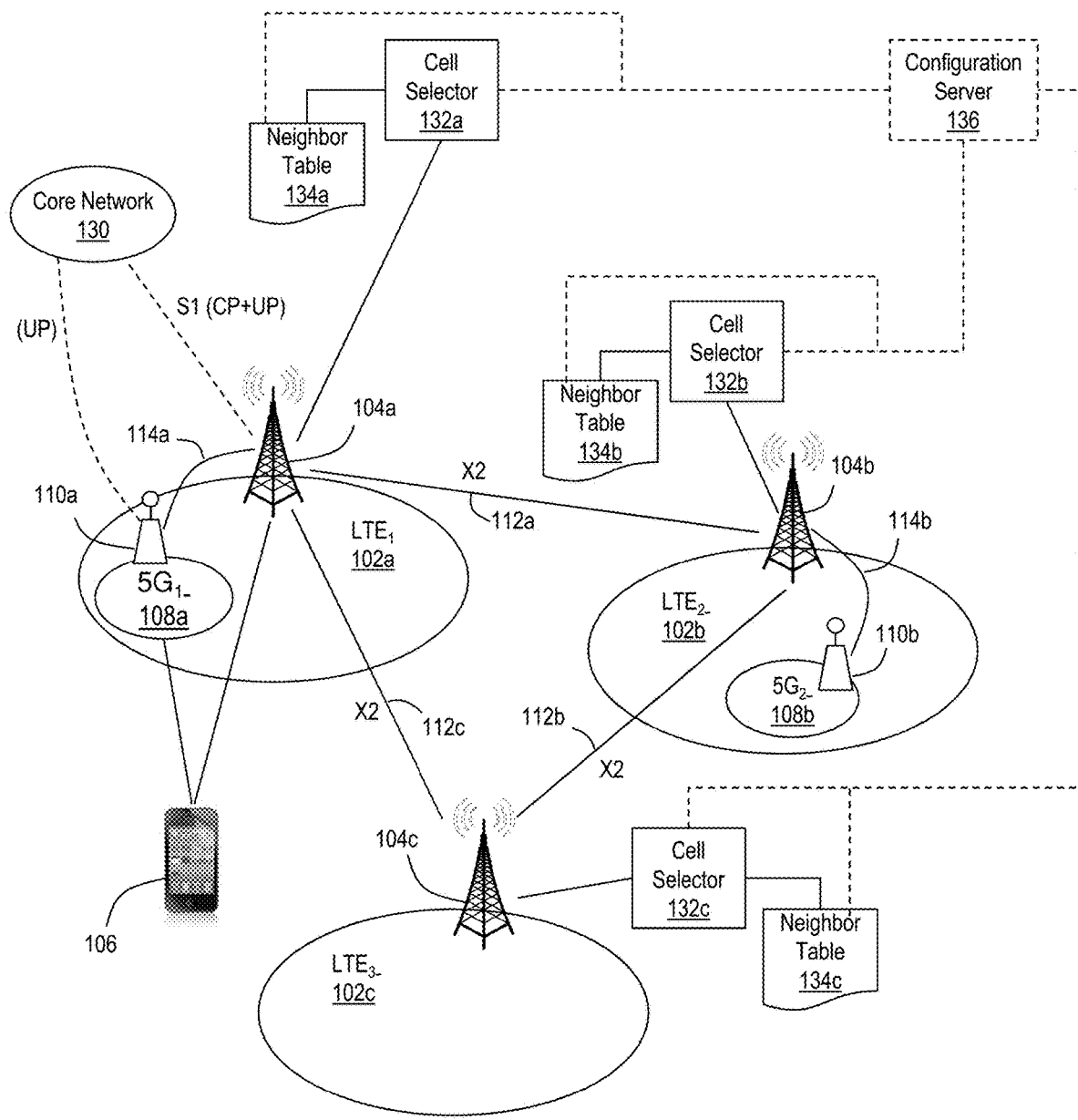
FIG. 1 depicts an illustrative embodiment of a wireless mobility network employing a dual connectivity solution.

The subject disclosure describes, among other things, illustrative embodiments for determining a suitability, rating and/or ranking of a wireless access node of a mobile cellular communications network with respect to dual connectivity (DC) services, in which mobile user equipment exchanges user data with multiple wireless access nodes contemporaneously. A serving node of the cellular network maintains the DC rankings of neighboring nodes and selects a DC master node based on the rankings. DC services are established in coordination with the target node as a DC master node, and another wireless access point, not necessarily included in the group of neighbor nodes, as a secondary node. In at least some embodiments, the master node is an eNB of a 3GPP LTE system and the secondary node is a 3GPP 5G NR node. Other embodiments are described in the subject disclosure.

One or more aspects of the subject disclosure include a system, having a processing system including a processor and a memory that stores executable instructions. The instructions, when executed by the processing system, facilitate performance of operations. The operations include determining a number of dual connectivity ratings for a number of neighbor cells of a serving cell of a mobile cellular network. A dual connectivity capability is identified of a mobile communication device that engages in wireless communications coordinated by the serving cell. A target cell of the number of neighbor cells is identified based on a dual connectivity rating of the number of dual connectivity ratings. Initiation of a dual connectivity service is facilitated based on the mobile communication device via the target cell, wherein the target cell serves as a master cell of the dual connectivity service, and wherein the dual connectivity service comprises exchanging user plane messages between the mobile communication device, the master cell and a secondary cell of the mobile cellular network.

One or more aspects of the subject disclosure include a process that includes determining a number of dual connectivity rankings for a number of neighbor cells of a serving cell of a mobile cellular network. A dual connectivity capability is determined of a mobile device that engages in wireless communications coordinated by the serving cell. A target cell of the number of neighbor cells is identified based on a dual connectivity ranking of the number of dual connectivity rankings. Initiation of a dual connectivity service is facilitated based on the mobile device via the target cell, wherein the target cell serves as a master cell of the dual connectivity service, and wherein the dual connectivity service comprises exchanging user plane messages between the mobile device, the master cell and a secondary cell of the mobile cellular network.

One or more aspects of the subject disclosure include machine-readable storage medium, including executable instructions that, when executed by a processing system including a processor, facilitate performance of operations. The operations include determining dual connectivity values for neighbor cells of a serving cell of a wireless network. A dual connectivity capability is determined of a wireless device that engages in wireless communications coordinated by the serving cell. A target cell of the neighbor cells is determined based on a dual connectivity value of the dual connectivity values. Initiation of a dual connectivity service is facilitated based on the wireless device via the target cell, wherein the target cell serves as a master cell of the dual connectivity service, and wherein the dual connectivity service includes exchanging user plane messages between the wireless device, the master cell and a secondary cell of the wireless network.

When DC UE runs a DC friendly application, such as eMBB, it can be desired to enable DC for the UE. When DC UE moves around and needs to switch anchor cell, it can be best to be handed over to the DC capable neighbor, otherwise the performance may degrade. To facilitate such optimal anchor cell selection, the serving cell may need to know the capability of neighbor cell. One or more of the exemplary embodiments, can provide mechanisms to dynamically prioritize and select preferred LTE anchor cell for LTE-5G NR dual connectivity operation.

FIG. 1 depicts an illustrative embodiment of an example wireless mobility system or network 100 adapted for dual connectivity applications. The system 100 includes a first or primary connectivity cell, e.g., an LTE cell, $LTE_1$, 102a, having a first wireless access point, e.g., an LTE base station, e.g., eNB 104a, a second primary connectivity cell, e.g., another LTE cell, $LTE_2$, 102b having a second base station, e.g., eNB 104b, and a third primary connectivity cell, e.g., yet another LTE cell, $LTE_3$, 102c having a third base station, e.g., eNB 104c. The LTE cells 102a, 102b, 102c, generally 102, provide wireless service to mobile user equipment, e.g., user equipment (UE) 106, within their respective wireless coverage regions or footprints. according to LTE disclosed in 3GPP standards, e.g., the various 3GPP LTE standards of release 12, or later, incorporated herein by reference in their entireties.

The system 100 further includes a first alternative connectivity cell, e.g., a 5G connectivity cell $5G_1$, 108a, having a first wireless access point (WAP), e.g., WAP 110a, and a second alternative connectivity cell, e.g., a second 5G connectivity cell, $5G_2$, 108b having a second WAP, e.g., 110b. The 5G cells 108a, 108b, generally 108, are also adapted to provide wireless service to mobile user equipment, e.g., UE 106, within their respective wireless coverage regions or footprints.

Overlapping cells 102, adjacent cells 102 and/or non-adjacent cells 102 proximal to each other, e.g., within a particular locality or region, can be referred to as neighboring cells 102. UEs 106 receiving wireless service via the mobile cellular network 100, establish radio link with one or more of the eNBs 104a, 104b, 104c, generally 104, sometimes referred to as the "air interface." The radio link typically includes an uplink portion, referring to messages directed from the UE 106 towards the eNB 104, and a downlink portion, referring to messages directed from the eNB 104 towards the UE 106. For LTE applications, the air interface employs a Radio Resource Control (RRC) protocol. The RRC protocol is used in a layer that exists at the IP level between UE 106 and eNB 104. Examples of RRC protocols include, without limitation, a UMTS RRC protocol specified, e.g., by 3GPP in TS 25.331, Rel 12 or later, and an LTE RRC protocol specified, e.g., by 3GPP in TS 36.331, Rel 12 or later, each of which is incorporated herein by reference in its entirety. RRC messages can be transported via a Packet Data Convergence Protocol (PDCP), e.g., specified by 3GPP in TS 25.323, Ver. 12 or later, for UMTS and TS 36.323 for LTE, Ver. 12 or later, each of which is incorporated herein by reference in its entirety.

As disclosed herein, reference to primary cells refer to so-called master cells of a DC configuration. An eNB 104 of a primary or master cell 102 can terminate a wireless link to the UE 106, e.g., according to a first radio access technology, e.g., 3GPP LTE access technology. User data, such as user packets, can be exchanged by way of an established bearer, e.g., a standard bearer, and/or a specialty bearer, e.g., having a quality of service (QoS) and/or other features adapted to facilitate a particular service or application, such as voice, video, data, and the like.

Likewise, reference to secondary cells refer to so-called secondary cells of a DC configuration. A WAP 110 of a secondary cell 108 can terminate a wireless link to the UE 106, e.g., according to the first radio access technology, and/or a second radio access technology, e.g., a different 3GPP access technology and/or a non-3GPP access technology. User data, such as user packets, can be exchanged between the UE and the eNB 104 and/or WAP 110 by way of an established bearer, e.g., a default bearer, and/or a dedicated bearer, e.g., having a quality of service (QoS) and/or other features adapted to facilitate a particular service and/or application, such as voice over IP (VoIP), video, data, and the like.

It is understood that, in general, a network configuration can include any number of cells 102, 108, operating in one or more of licensed frequency spectra, e.g., LTE, unlicensed spectra, e.g., Wi-Fi and/or 5G NR, and the like. It is further understood that neighboring cells 102, 108 can provide wireless coverage footprints, or cell sizes, that are overlapping, adjacent, and/or separated from each other. The extent, e.g., range, shape, location, etc., of the example cells 102, 108 are merely illustrative. It is understood that one or more of the cells 102, 108 can have different shapes, e.g., sectors and that one or more of the cells 102, 108 may be adjacent, overlapping and/or isolated from other cells 102. It is understood further that cell sizes e.g., ranges, can be equal or different. In the illustrative example, the small cells 108a, 108*b*, generally 108 fall within the wireless coverage footprints of respective LTE cells 102. Coverage footprints of the small cells 108 can be located entirely within the coverage footprints of the LTE cells 102, as illustrated, or they can straddle edges of the coverage footprints of the LTE cells 102, or they can be located external to the coverage footprints of the LTE cells 102, or any combination thereof.

In DC applications one or more bearers can be split over one or more different eNBs 104 and or WAPs 110. Namely, a single mobile equipment, e.g., UE 106, can consume radio resources provided by at least two different network points, e.g., one or more different eNBs 104 and or WAPs 110. A master cell group includes a group of serving cells associated with a master eNB (MeNB). In DC applications, a master eNB terminates at least one S1-MME with a mobile core network, such as an evolved packet core (EPC) 130 of an LTE network. Accordingly, the MeNB acts as a mobility anchor towards the EPC 130. In other words, the MeNB can facilitate handovers of the UE 106 to one or more other MeNB of the master cell group. Handovers include, without limitation, a transfer of radio access technology link from one eNB to another, which may result from one or more scenarios, such as network traffic and/or congestion, licensed spectrum traffic and/or congestion, equipment states, such as processing capacity, memory capacity, maintenance, and/or error status.

Likewise, In DC applications, a secondary eNB (SeNB) is an eNB that provides additional radio resources for the UE 106, which is not the MeNB. This can include one or more of the eNBs 104 and/or one or more of the WAPs, e.g., the 5G WAPs 110. In at least some embodiments, there is an interface between the MeNB, e.g., eNB 104, and the SeNB, e.g., 5G WAP 110. According to an example E-UTRAN architecture, the interface can include an "Xn" interface, e.g., an X2 interface allowing interconnections between two gNBs or one gNB and one eLTE eNB. More generally, as used herein, "Xn" or "Xn/X2" can refer to connections between any combinations of gNB and eNB, including two eLTE eNBs. Example X2 interfaces 112*a*, 112*b*, 112*c*, generally 112, are illustrated between the eNBs 104. Another example interface 114*a*, e.g., an Xn or and Xn/X2 interface is provided between the first eNB 104*a* and the first 5G-WAP 110*a*. Likewise, another example Xn/X2 interface 114*b* is provided between the second eNB 104*b* and the second 5G-WAP 110*b*. It is understood that in at least some embodiments, any one of the 5G-WAPs 110 can interface with any one or more of the eNBs 104. Alternatively or in addition, at least some of the 5G-WAP 110 engaging in DC operations, e.g., as SeNB, can do so without necessarily having an interface with any one of the MeNB 104.

Although the example interfaces 112, and 114*a*, 114*b*, generally 114, are shown as existing between one or more of the eNBs 104 and/or 5G-WAPs 110, it is understood that they may instead terminate at another network location, such as an up-stream node, e.g., between the eNB 104, 5G-WAP 110 and a respective core network, e.g., EPC 130.

The mobile user equipment, e.g., UE 106, can include, without limitation, mobile communication devices, such as mobile telephones, smart phones, laptop computers, desktop computers, tablet devices, and the like. In at least some embodiments, one or more of the mobile user equipment can include other devices, such as any IP enable device. Examples of IP enabled devices can include, without limitation, home security systems, home security system components, audio and/or video monitors, appliances, vehicles, smart meters, and the like. By way of illustrative example, mobile user equipment can include any device adapted for operation according to machine-type communications (MTC), e.g., according to the so-called Internet of Things (IoT). Although the term mobile user equipment is used, it is understood that one or more of the UEs 106 can include immobile equipment, such as fixed installation devices, e.g., home security systems, large devices, e.g., home appliances, such as washing machines, refrigerators, and so on.

LTE DC is often configured for low to medium mobility speed cases, supporting indoor and/or outdoor, ideal and/or non-ideal backhaul scenarios. Traditionally, LTE DC can be deployed in one of several different scenarios. For example, the aggregated serving cells of the involved eNBs 104 can be intra-frequency or inter-frequencies, and/or the cell coverage can be overlapping or non-overlapping. In a first scenario, sometimes referred to as a co-channel scenario, the eNB 104 and a small-cell WAP, operate on the same channel Examples include, without limitation, femtocell coverage of a location within a macro cell whereby both the macro cell and femtocell operate on the same channel. In another scenario, sometimes referred to as an inter-frequency scenario, the eNB 104 operates on a different channel from the small-cell WAP. Examples include, without limitation, small cell coverage, e.g., picocell or femtocell coverage, of a location within a macro cell, whereby both the macro cell and femtocell operate on different frequencies or channels. In yet other scenarios, sometimes referred to as small-cell-out-of-coverage-of-macro-cell scenarios, the small cell coverage falls outside of a macro cell. The small cell and macro cell can operate on the same and/or different channels, frequency bands, licensed, unlicensed, and the like.

In 5G NR applications, DC can take on additional dimension(s) of 5G coverage alone or in combination with other wireless mobile coverage, e.g., LTE 4G coverage. Consider one or more of the macro cells 102 in the foregoing examples as either LTE cells or 5G cells. Alternatively or in addition, consider one or more of the small cells 108 in the foregoing examples as 5G cells.

In homogeneous deployments, most or all of the cells provide similar coverage, e.g., all/most are macro or all/most are small cell. In heterogeneous deployments cells of different size are employed. In at least some configurations, the cells are overlapped, e.g., macro and small cells, as in the illustrative example of FIG. 1.

The cells in the foregoing scenarios can be classified into primary cells and secondary cells. A primary cell operates on the primary frequency in which the UE 106 either performs the initial RRC connection establishment procedure or initiates the RRC connection re-establishment procedure, or the cell 104 indicated as the primary cell in a handover procedure. In at least some embodiments, a secondary cell 104 can operate on a secondary frequency, which may be configured once an RRC connection is established and which may be used to provide additional radio resources.

In at least some embodiments, one of the cells, e.g., the macro cell 102, provides an "anchor carrier," which provides the UE 106 with a robust wide-area signaling connection, carrying system information, basic radio resource control (and potentially low rate or high reliability user data). The small cell, e.g., a 5G NR cell 108 provides another carrier, which can support an efficient delivery of user traffic within its local cell coverage area 108. The anchor carrier 104*a* ensures that the UE 106 has a reliable signaling connection, e.g., for message forwarding of a control plane, as it moves around a network coverage area, but traffic, e.g., at least a portion of message forwarding of a user plane, can be offloaded to a local 5G carrier 110. Such offloading can occur, e.g., if a user requires a period of intense communication, high bandwidth, low latency, and the like. At least some applications and/or services can be identified as being well-suited for such offloading. Examples include, without limitation, applications and/or services that require a relatively large bandwidth and/or a relatively low latency, and/or a relatively high reliability. Applications and/or services including video content offer at least one such category that is well suited for offloading.

A distributed radio access node (dRAN) architecture separates a radio function unit, e.g., sometimes referred to as a remote radio head (RRH), from the digital function unit, or baseband unit (BBU), e.g., by one or more of fiber, free space optical, microwave, twisted pair, cable, and the like.

The deployment scenarios in terms of CN-RAN connection can be classified into the following cases: LTE eNB is a master node; NR gNB is a master node; and eLTE eNB is a master node. The techniques disclosed herein can be considered as an evolution of eNB that supports connectivity to EPC and NG-Core. The example systems can support inter-RAT handovers between NR gNB and (e)LTE eNB.

In other configurations, the 5G-WAPs 110, sometimes referred to as gNBs can serve as anchor cells. For example, the UE 106 can camp on the gNB 110, exchanging control plane and user plane messages with a next generation core network 130 of a 5G portion of the mobile network 100. For example, offloading from a gNB 110 to an eNB can be accomplished in another DC configuration. It is understood that in at least some scenarios, the gNB 110 can serve as mobility anchors, e.g., of a master gNB (MgNB) group, relying on the eNBs as secondary eNBs (SeNBs) for DC operation. Rules for initiating DC according to any of the example embodiments disclosed herein can be determined by a network service provider, e.g., a mobile network operator, an application and/or mobile service provider and/or a third party. For example, DC rules can be determined by an enterprise network operator and or a mobile service operator. DC rules can be enforced according to logic at the eNB 104 and/or gNB 110 level, and/or at another level, such as at the core network 130 and/or at another network location, such as a third-party server.

According to the illustrative example network 100, a first eNB 104a is in communication with a first cell selector 132a. Alternatively or in addition, one or more of the other eNBs 104b, 104c are in communication with a respective cell selector 132b, 132c. The cell selector(s) 132a, 132b, 132c, generally 132, can implement or otherwise enforce rules and/or logic related to DC operation. Examples of cell selectors include devices and/or systems adapted to implement selection rules and/or logic as disclosed hereunder. Examples of cell selection rules and/or logic include, without limitation, one or more of identifying DC capabilities of the UE 106, determining that the UE 106 is within a wireless coverage region of one or more SeNB and/or SgNB, and/or determining whether any DC equipped UE 106 within SeNB/SgNB coverage is utilizing and/or likely to utilize an application and/or service adapted for DC offloading.

According to the illustrative examples, the UE 106 ca include a first radio system adapted to access LTE radio access technology, and a second radio system adapted to access 5G NR radio access technology. Although different radio systems are disclosed, it is understood that some or all of any particular radio system, e.g., antennas, baseband processors and the like, can be adapted to facilitate access to more than one radio access technologies, e.g., LTE and 5G NR radio access technologies.

One or more of the cell selectors 132a, 132b, 132c can be in further communication with one or more of a number of neighbor relations tables 134a, 134b, 134c, generally 134. In the illustrative example each cell selector 132 is in communication with a corresponding neighbor relations table 134. It is understood that at least some of the cell selectors 132 and/or the neighbor relations tables 134 can be provide at or in close physical proximity to a respective eNB 104 and/or gNB 110. Alternatively or in addition, one or more of the cell selectors 132 and/or the neighbor relations tables 134 can be physically separated from a respective eNB 104 and/or gNB 110. Examples of physical separation include locating the cell selectors 132 and/or the neighbor relations tables 134 at an up-stream location, e.g., at a physical and/or network location between the eNB 104 and/or the gNB 110 and a corresponding core network 130. Alternatively or in addition, the cell selectors 132 and/or the neighbor relations tables 134 can be located at the core network 103, at a data center associated with the mobile network operator and/or at any arbitrary physical and/or network location, such as a location of a third party supporting DC operation.

The neighbor relations tables 134 can include, without limitation, identification of a MeNB 104 and/or MgNB 110, as the case may be, e.g., a cell identifier (cell ID) as a unique value to identify each eNB/gNB, alone or in combination with identifiers of neighboring eNBs 104 and/or neighboring gNBs 110. For example, in at least some embodiments, for each cell that the eNB 104/gNB 110 has, the eNB 104/gNB 110 maintains a neighbor relations table 134. For each neighbor relation, the neighbor relations table 134 includes a Target Cell Identifier (TCI) that identifies a target cell. By way of example for E-UTRAN, the TCI corresponds to an E-UTAN Cell Global Identifier (ECGI) and Physical Cell Identifier (PCI) of the target cell. In at least some embodiments, the neighbor relations table includes one or more additional attributes as described further hereinbelow.

In at least some embodiments, the system 100 includes a configuration server 136. The configuration server 136 can be owned, operated and/or maintained by the mobile network operator and/or by arrangement with another third party entity on behalf of the mobile network operator. In some embodiments, the configuration server 136 is in communication with one or more of the eNB 104 and/or gNB 110. Alternatively or in addition, the configuration server 136 is in communication with one or more of the cell selectors 132 and/or the neighbor relations tables 134.

Figure 2:
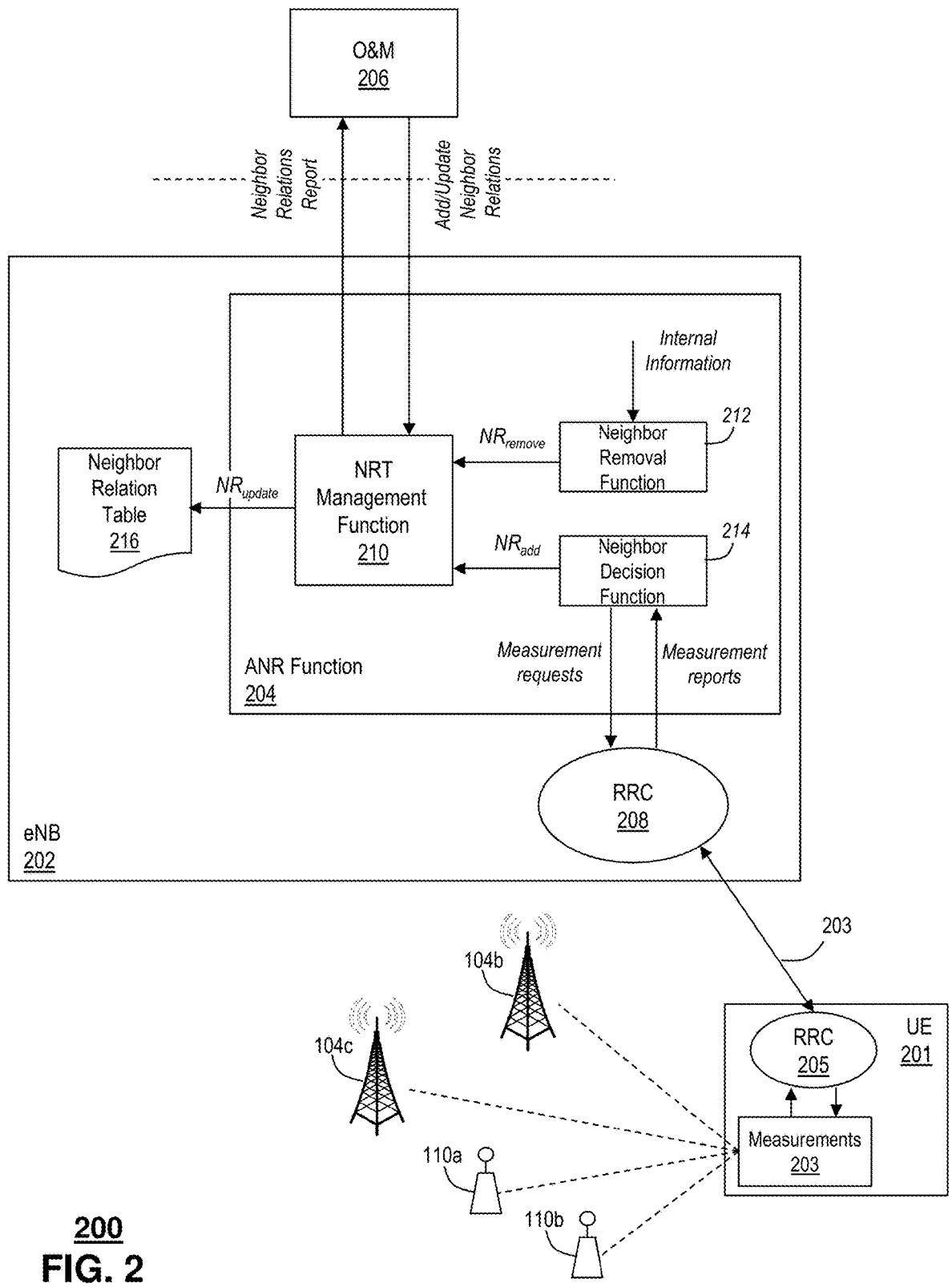
FIG. 2 depicts an illustrative embodiment of an example of an eNB.

FIG. 2 depicts an illustrative embodiment of an example of an eNB 202, such as the eNBs 104 (FIG. 1). The eNB 202 includes a radio module adapted to engage in wireless communications with user equipment, e.g., a UE 201, over an air interface 203. In the illustrative example, the eNB 202 is adapted for 3GPP LTE operation. The radio module can include a radio resource control (RRC) module 208 adapted to facilitate one or more radio functions, such as connection establishment and/or release functions, broadcast of system information, radio bearer establishment, reconfiguration, release, mobility procedures, and the like.

The eNB 202 further includes an automatic neighbor relation (ANR) function module 204. In at least some embodiments, the ANR function module 204 is in further communication with a neighbor relations table 216. The neighbor relations table 216 can be stored locally at or within the eNB 202. Alternatively or in addition, the neighbor relations table 216 can be stored at another location physically separated from the eNB 202. In more detail, the ANR function module 204 is adapted to manage the neighbor relations table 216. By way of illustrative example, management of the neighbor relations table 216 can include one or more of adding neighbors, removing neighbors, associating and/or updating neighbor attributes, and the like.

The example ANR function module 204 includes a neighbor removal function module 212 and/or a neighbor decision module 214. The neighbor removal function module 212 and/or the neighbor decision function module 214 can be in communication with the neighbor relation table management module 210. In at least some embodiments, the neighbor removal function module 212 receives information obtained internally, e.g., within the eNB 202. The neighbor removal function module 212 processes the information and determines whether a particular neighbor should be removed from the neighbor relation table 216. To the extent that it is determined that a neighbor should be removed, the neighbor removal function module 212 sends a neighbor removal command, $NR_{remove}$ to the neighbor relation table management function module 210. Upon receiving the $NR_{remove}$ command, the neighbor relations table management function module 210 provides a neighbor relations table update $NR_{update}$ to the neighbor relation table 216. In response to the $NR_{update}$, the neighbor relation table 216 is updated to, e.g., remove the identified neighbor from the neighbor relation table 216.

In at least some embodiments, the neighbor decision function module 214 receives information about neighboring cells. This information can be obtained externally, e.g., from the UE 201 via the air interface 203, from an operations and maintenance system 206, and/or directly from another neighboring cell, e.g., via an X2 interface. Information from a neighboring cell can be obtained directly from the neighboring cell, or from another mutually neighboring cell, e.g., cell B provides measurements to cell A about performance of cell C. The neighbor decision function module 214 processes the information and determines whether a particular neighbor should be added to the neighbor relation table 216. To the extent that it is determined that a neighbor should be added, the neighbor decision function module 214 sends a neighbor add command, $NR_{add}$ to the neighbor relation table management function module 210. Upon receiving the $NR_{add}$ command, the neighbor relations table management function module 210 provides a neighbor relations table update $NR_{update}$ to the neighbor relation table 216. In response to the $NR_{update}$, the neighbor relation table 216 is updated to, e.g., add the identified neighbor to the neighbor relation table 216.

In at least some embodiments, the eNB 202 receives measurement reports over the air link 203 from the UE 201. The measurement reports can be unsolicited, e.g., the UE 201 obtains measurements of a newly discovered neighbor and provides the measurements in the form of a measurement report to the neighbor decision function module 214. The UE 201 may discover a new neighbor, e.g., by roaming into a coverage area of the neighbor cell. For example, the newly discovered neighbor cell can include a non-LTE cell, such as a Wi-Fi WAP and/or a 5G-WAP 110 (FIG. 1).

Alternatively or in addition, the neighbor decision function module 214 can provide a measurement request to the UE 201, e.g., via the RRC 208, over the air link and via a RRC module 205 of the UE 201. The RRC module 295, in turn, communicates with a measurement module 203 of the UE 201 to initiate the requested measurement. Without limitation, the requested measurement can include one or more measurements of one or more channels of one or more neighboring UEs. In at least some embodiments, the requested measurement can be directed to a measurement of the requesting eNB 202. Measurements can include one or more of signal presence, signal strength, channel capacity, QoS, errors, e.g., error rates, synchronization errors, and the like. For UEs 201 equipped with multiple radios and/or capable of operating in different bands and/or according to different wireless protocols, the measurements can include measurements of any available eNB, e.g., eNB 104c, 104b, and/or any available WAP, e.g., 5G-WAP 110a, 110b.

In at least some embodiments, the neighbor relation table management function module 210 is in communication with an O&M system 206. Messages and/or instructions exchanged between the neighbor relation table function module 210 and the O&M system 206 can include a request from the O&M system 206 to add and/or update neighbor relations. For example, the neighbor relation table management function module, in response to receiving an add/update neighbor relations instruction/command from the O&M system 202, generates an $NR_{update}$ message to update the neighbor relation table 216. The $NR_{update}$ message can be based on input from the O&M system 206 alone and/or on information obtained from one or more measurement reports, e.g., initiated by measurement requests responsive to the add/update neighbor relations command. In at least some embodiments, the neighbor relation table management function module 210 provides a neighbor relations report to the O&M system 206.

Figures 3, 4:
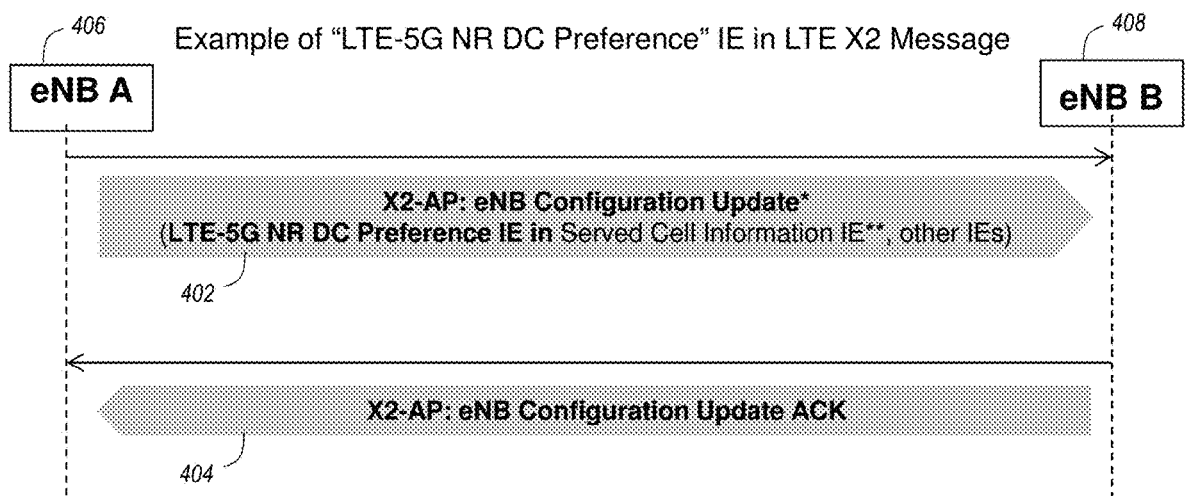
FIG. 3 depicts an illustrative embodiment of a neighbor relations table to facilitate management of neighbor relations.
FIG. 4 depicts an illustrative embodiment of an LTE Xn/X2 message exchange to facilitate implementation of dual connectivity solutions.

FIG. 3 depicts an illustrative embodiment of a neighbor relations table 300 to facilitate management of neighbor relations. The example neighbor relations table 300 includes one column 302 including a neighbor cell relation (NR) reference, e.g., a number. An NR, e.g., from a source cell to a target cell, indicates that an eNB 104 (FIG. 1) controlling the source cell 102 (FIG. 1) knows the ECGI/CGI and/or Physical Cell Identifier (PCI) of the target cell and has an entry in the neighbor relations table 300 for the source cell identifying the target cell.

Another column 304 includes a target cell identifier (TCI). For each cell 102 that the eNB 104 has, the eNB 104 keeps an NRT 134 (FIG. 1). For each NR, the neighbor relations table 300 contains the Target Cell Identifier (TCI), which identifies the target cell. For E-UTRAN, the TCI corresponds to an E-UTAN Cell Global Identifier (ECGI) and/or Physical Cell Identifier (PCI) of the target cell. One or more additional columns include one or more attributes associated with a particular neighbor relation.

The eNB 104 serving cell 102 equipped with an automatic neighbor relation (ANR) function module 204 (FIG. 2), instructs each UE 201 (FIG. 2) to perform measurements on neighbor cells 104, 110, e.g., as a part of a normal call procedure. When the UE 201 discovers a new cell ECGI, the UE 201 reports the detected ECGI to the serving cell eNB 104. In at least some embodiments, the UE 201 also reports the tracking area code and all PLMN IDs that have been detected. The eNB 104 adds the newly discovered neighbor relation to neighbor relation table 300.

In at least some embodiments, the eNB 104 of the serving cell 102, equipped with an ANR function module 204, can instruct the UE 201 to perform measurements and detect cells on other radio access terminals and/or other frequencies, e.g., during connected mode. The UE 201 reports information, such as PCI, of the detected cells 102, 108 in the target radio access terminal and/or frequencies. When the eNB 201 receives measurement reports from the UE 201 containing information, such as PCIs of neighboring cell(s), the eNB 202 may instruct the UE 201 to read certain information based on the detected neighbor cell, updating its neighbor relation table 216 after receiving relevant information from the UE 201.

Example attributes include those defined in 3GPP TS 36.300, rel. 12, including "No Remove," "No HO," and "No X2." For example, the neighbor relations table includes one column 306 to indicate whether a particular NR should be configured with a "no remove" status. No Remove means: If checked, the eNB shall not remove the neighbor cell relation from the neighbor relation table when running a function to remove aged NRs. Such a status would prevent an associated NR from being removed from the neighbor relation table 300, regardless of any command, network and/or equipment condition. Likewise, another attribute includes another column 308 to indicate whether a particular NR should be configured with a "no handover (HO)" status. Such a status would prevent an associated NR from being handed over, when so indicted in the neighbor relation table 300, regardless of any commands, requests, network and/or equipment condition(s). Yet another attribute includes another column 310 to indicate whether a particular NR does not have an X2 interface, or an existing X2 interface should not be used. Such a status would prevent an associated NR from accessing/using an X2 interface, and/or alert the ANR function module 304 that an X2 interface is not available, when so indicted in the neighbor relation table 300, regardless of any commands, requests, network and/or equipment condition.

According to the techniques disclosed herein, another attribute includes a column 312 to indicate a DC preference, rank, capability, or the like. It is understood that NRs can involve equipment, such as eNBs 104 and/or gNBs 110 having different configurations and/or capabilities. In some instances a target cell of a particular NR may not be configured or otherwise adapted to support DC functions. In such instances, the DC preference entry can include a value indicative of no DC support. The value can include an alphanumeric value, a binary value, or any other suitable character or value, including a null value. It is understood that at least some of the eNBs 104 and/or gNBs 110 having one or more configurations and/or capabilities that support DC functions. In some instances a first target cell of a particular NR may be configured or otherwise adapted to support DC functions by way of a first configuration. The illustrative example includes three levels of DC preference, e.g., "preferred," "fallback" and "no support." It is understood that a greater and/or fewer number of levels of DC preference can be used.

Likewise, a second target cell of the NR may be configured or otherwise adapted to support DC functions by way of a second configuration. Depending upon the particulars of the different configurations, the first configuration may be more or less preferable than the second configuration. Accordingly, the DC preference entry can include one or more values indicative of the particular configuration and/or a relative preference, ranking, capability, or the like. In such instances, the DC preference entry can include a value indicative of no DC support. The value can include an alphanumeric value, a binary value, or any other suitable character or value, including a null value.

In at least some embodiments, one or more of the neighbor relation attributes, e.g., columns 306, 308, 310, 312, can be controlled by an O&M system 206 (FIG. 2). For example, the O&M system 206 can set certain attributes, such as no remove, no HO and/or no X2 according to system management preferences, hardware and/or network requirements, and the like. Alternatively or in addition, the O&M system 206 can set certain attributes of the DC preference. In at least some embodiments, the DC preferences are set according to configuration and/or capability of a target cell of the associated NR 302. Configurations and/or capabilities would generally be known to the O&M system 206. However, in at least some embodiments, it is understood that a value of the DC preference column 312 can be set and/or changed according to other means. For example, a target cell may self-report its configuration and/or capabilities, e.g., over an X2 interface with a serving cell. Alternatively or in addition, a neighbor cell, e.g., including the serving cell, may determine and/or otherwise infer a configuration and/or capability of the target cell.

FIG. 4 depicts an illustrative embodiment of an LTE X2 message exchange 400 to facilitate implementation of dual connectivity solutions. The X2 Application Protocol (AP) is used to handle UE mobility within E-UTRAN and provides one or more of the following functions: mobility management; load management; reporting of general error situations, resetting the X2, setting up the X2, and/or eNB configuration updates. The illustrative example includes a first X2-AP message based on an eNB Configuration Update function. An example eNB configuration update message is disclosed in 3GPP TS 36.423, section 8.3.5. This message is sent by an eNB to a peer eNB to transfer updated information. The eNB Configuration Update function allows updating of application level data needed for two eNBs 406, 408 to interoperate correctly over an X2 interface.

The example X2-AP eNB Configuration Update message is exchanged between a first eNB_A 406 and a second, peer eNB_B 408. Upon receipt of the message 402, eNB_B 408 updates the information for eNB_A 406. The second eNB_B 408 replies with an X2-AP: eNB Configuration Update Acknowledgement message 404 to inform the initiating eNB_A 406 that the requested update of application data was performed successfully.

The example X2-AP protocol eNB Configuration Update message 402 can include any of the traditional information elements generally known to be associated with the message in addition to another information element (IE) directed to DC preference. An example of a Served Cell Information IE of an eNB Configuration Update message is disclosed 3GPP TS 36.423, section 9.2.8. In at least some embodiments, an LTE-5G NR DC Preference IE can be added to the existing message, e.g., as a field of Served Cell Information IE. The DC Preference IE can include an indication of the preference disclosed above in the example neighbor relation table 300 (FIG. 3). Namely, the DC Preference IE can include the particular value to be included in the DC preference column 312 of the neighbor relation table 300. Alternatively or in addition, the DC preference IE can include a value suggestive of and/or that, when subject to analysis and/or interpretation can provide an indication of the DC preference value to be included in the DC preference column 312 of the neighbor relation table 300.

Figure 5A:
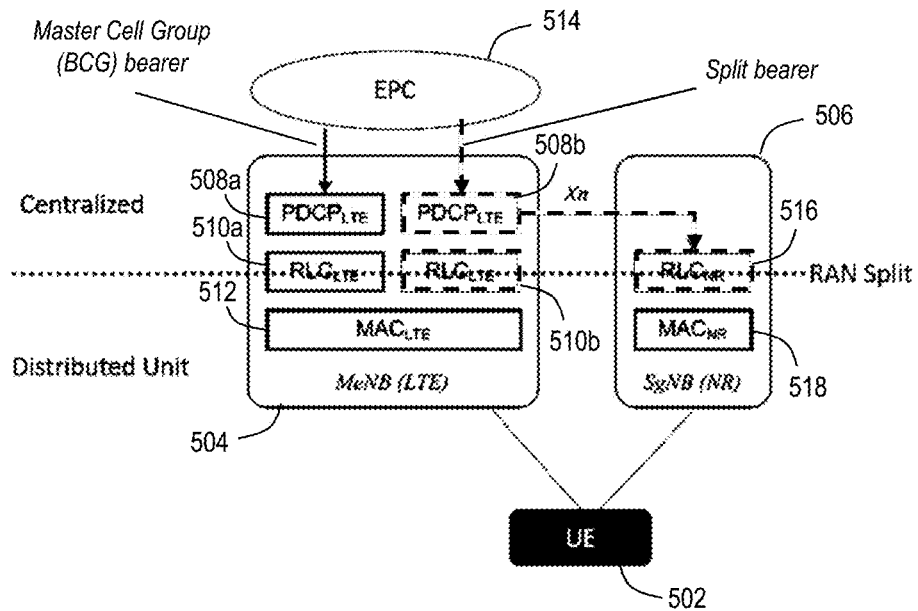
FIGS. 5A-5B depicts illustrative embodiments of portions of wireless mobility networks employing dual connectivity solutions.
Figure 5B:
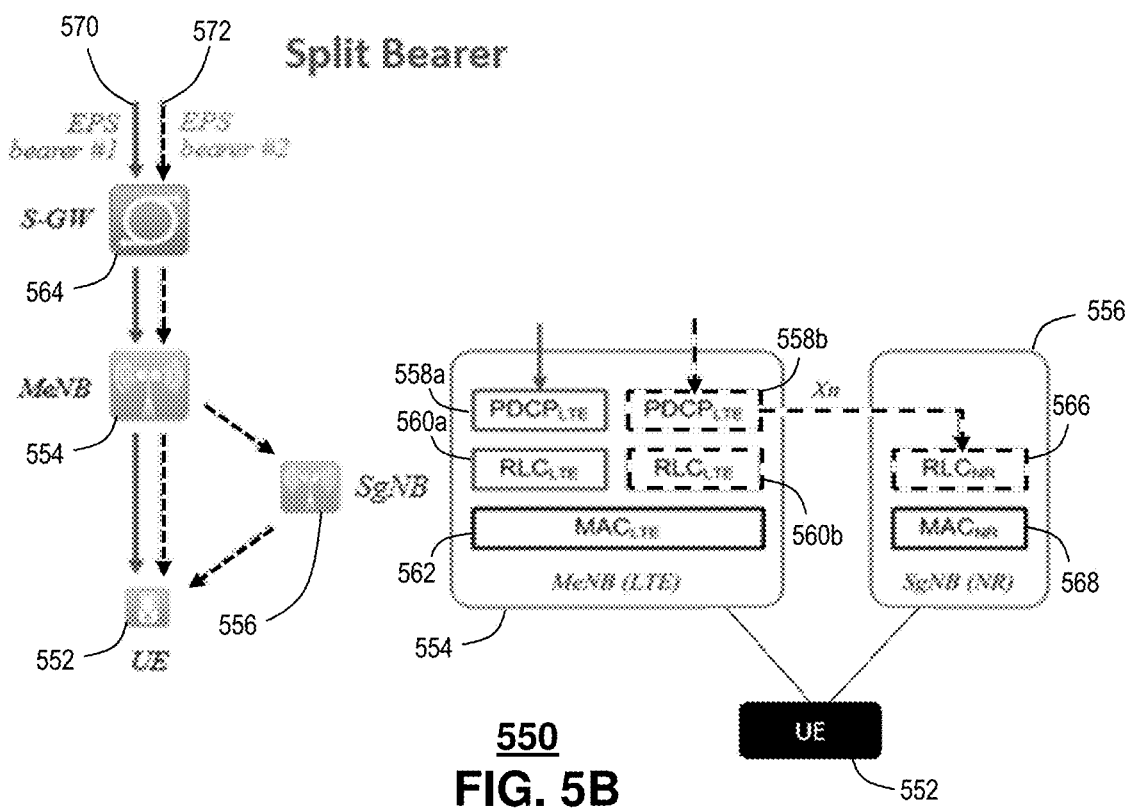

FIGS. 5A-5B depicts illustrative embodiments of portions of wireless mobility networks 500, 550 employing dual connectivity solutions. According to a first illustrative example of FIG. 5A, the system includes a split radio access node (RAN) 500. For example, the split RAN includes PDLC/RLC non real-time function module(s) that can be split and moved to another geographic and/or network location that is physically separate from the base station, e.g., eNB, and/or gNB. The split RAN system includes a MeNB 504 and a SgNB 518. The MeNB 504 includes a first $PDCP_{LTE}$ module 508a and a second $PDCP_{LTE}$ module 508b, a first $RLC_{LTE}$ module 510a and a second $RLC_{LTE}$ module 510b, and a $MAC_{LTE}$ module 512. A lower portion of the example split RAN node 500, including the $MAC_{LTE}$ module 512 serves as a distributed unit, e.g., being location at the MeNB. An upper portion serves as a remote, e.g., a centralized portion of the example split RAN node 500, including the PDCP$_{LTE}$ modules 508a, 508b and the RLC$_{LTE}$ modules 510a, 510b. The upper or centralized portion is in communication between the distributed portion and an evolved packet core (EPC) 514. A first master cell group bearer(s) is processed by the first PDCP$_{LTE}$ 508a, the first RLC$_{LTE}$ 510a and the MAC$_{LTE}$ 512. Likewise, a separate but related and/or a split bearer is processed by the second PDCP$_{LTE}$ 508b, the second RLC$_{LTE}$ 510b and the MAC$_{LTE}$ 512.

According to a DC service established between the MeNB 504 and the SgNB 506, user data associated with the separate but related and/or split bearer are exchanged between the second PDCP$_{LTE}$ 508b and an RLC$_{NR}$ 516 of the SgNB 506. The SgNB 506 further includes a MAC$_{NR}$ 518 to facilitate processing of the separate/split bearer data packets according to DC services. Beneficially, the same UE 502 exchanges control messages via the MeNB 504, e.g., related to mobility, establishment of DC services, and the like. The same UE 502 contemporaneously exchanges data messages via the SgNB 506 according to DC services. For applications using 5G NR, the user message bandwidth is expected to be substantially greater than otherwise available using LTE. Accordingly, user data messages can be selectively processed by the SgNB 506 according to a DC service established by the MeNB 502.

It is worth noting that the foregoing split RAN embodiment 500 is an example of a so-called, LTE-5G NR DC "preferred" MeNB. The preference can be related, at least in part, to an Xn interface connects centralized PDCP/RLC 508b, 510b, independent of LTE anchor cell RLC 510a/ lower layer capability and location.

According to a second illustrative example of FIG. 5B, the system 550 includes a radio access node (RAN), e.g., an MeNB 554 that is not split, as in the previous example. For example, the MeNB 554 includes a PDLC/RLC non realtime function module(s). Once again, the system 550 includes a MeNB 554 and a SgNB 556. The MeNB 554 includes a first PDCP$_{LTE}$ module 558a and a second PDCP$_{LTE}$ module 558b, a first RLC$_{LTE}$ module 560a and a second RLC$_{LTE}$ module 560b, and a MAC$_{LTE}$ module 562. A lower portion of the example split RAN node 560, including the MAC$_{LTE}$ module 512 serves as a distributed unit, e.g., being location at the MeNB, together with an upper portion, including the PDCP$_{LTE}$ modules 558a, 558b and the RLC$_{LTE}$ modules 560a, 560b. The upper portion is in communication between the lower portion and an evolved packet core (EPC). A first EPS bearer 570 is processed by the first PDCP$_{LTE}$ 558a, the first RLC$_{LTE}$ 560a and the MAC$_{LTE}$ 562. Likewise, a separate but related and/or a split bearer is processed by the second PDCP$_{LTE}$ 558b, the second RLC$_{LTE}$ 560b and the MAC$_{LTE}$ 562.

According to a DC service established between the MeNB 554 and the SgNB 556, user data associated with the separate but related and/or split bearer are exchanged between the second PDCP$_{LTE}$ 558b and an RLC$_{NR}$ 566 of the SgNB 556. The SgNB 556 further includes a MAC$_{NR}$ 568 to facilitate processing of the separate/split bearer data packets according to DC services. Beneficially, the same UE 552 exchanges control messages via the MeNB 554, e.g., related to mobility, establishment of DC services, and the like. The same UE 552 contemporaneously exchanges data messages via the SgNB 556 according to DC services. For applications using 5G NR, the user message bandwidth is expected to be substantially greater than otherwise available using LTE. Accordingly, user data messages can be selectively processed by the SgNB 556 according to a DC service established by the MeNB 552.

It is worth noting that the foregoing non-split RAN embodiment 550 is an example of a so-called, LTE-5G NR DC "fallback" MeNB. The preference can be related, at least in part, to an Xn interface that connects the PDCP/RLC 558b, 560b.

Figure 6:
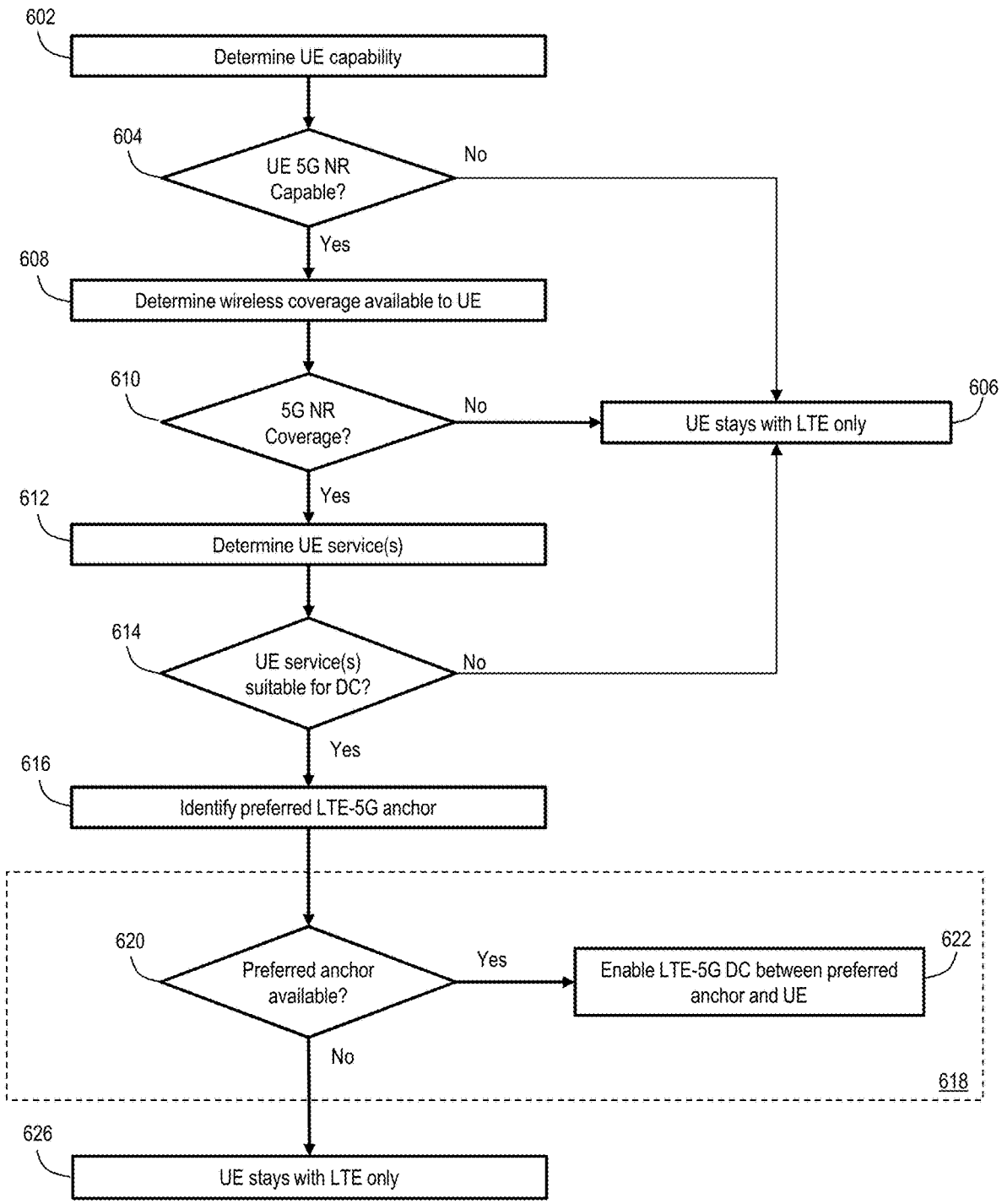
FIGS. 6-7 depicts illustrative embodiments of processes used in portions of the system described in FIGS. 1-5B.

FIG. 6 depicts an illustrative embodiment of a process 600 used to facilitate DC service between a 3GPP LTE eNB 104 and a 5G WAP 108 (FIG. 1). A capability of a UE 106 (FIG. 1) is determined at 602. In particular, the capability is indicative of a DC capability of the UE 106. It is understood that DC includes a contemporaneous exchange of user data with multiple wireless access points/base stations. Sometimes the different WAPs/eNBs are on different channels and/or operating within different networks altogether, e.g., LTE vs. 5G. Accordingly, a DC capable UE 106 can include multiple radios, which can be adapted to operate in different bands and/or according to different wireless access protocols.

A determination is made at 604 as to whether the UE 106 is 5G NR capable. UE capabilities can be determined by any of various techniques. For example, the UE 106 can report or otherwise identify its capabilities via a message exchange with a serving node of the wireless network. Alternatively or in addition, the capabilities can be determined by a predetermined association, e.g., according to a lookup table. In such applications, the UE 106 can identify itself, e.g., according to an equipment type, model number, equipment identification (ID), and the like. The equipment type and/or ID can be used as a reference to identify capabilities from another source, such as a network operator, an equipment manufacturer, and/or a third party service, such as an equipment type repository.

Responsive to determining that UE is not 5G NR capable, the UE stays with LTE only at 606. It is understood that DC service can be established for other network nodes, such as other LTE nodes, Wi-Fi nodes and the like, despite the UE not being 5G NR capable. Accordingly, the techniques disclosed herein can be applied broadly to any DC service configuration. The illustrative example merely includes a scenario in which DC service is extended from an LTE network node to a 5G NR network node. It is worth noting that in at least some instances, the techniques disclosed herein can be applied in a 5G-5G DC service scenario and/or a scenario in which LTE service is extended from a 5G NR network node to an LTE network node.

Responsive to determining that the UE is 5G NR capable, wireless coverage available to UE is determined at 608. For example, a UE 106 being served from an eNB 104 receives an indication from the UE 106, e.g., by way of a measurement report, that the UE 106 is within a wireless coverage of one or more mobile network nodes, such as eNBs 104 and/or 5G-WAPs 110. For example, a DC capable UE 106 can monitor LTE and/or 5G NR frequency bands to identify available services. The availability of LTE and/or 5G NR service may change based on one or more of mobility of the UE 106, network conditions, an operational state of the UE 106, and the like.

Availability of 5G NR coverage is determined at 610. This can be accomplished by receipt of a measurement report from the UE 106 indicating that it has detected and/or performed a measurement based on the 5G NR coverage. Measurements can include any measurements routinely performed by the UE 106, e.g., signal strength, signal frequency, channel and/or frequency band, QoS, errors, e.g., bit error rate, error parity, forward error correction values, and the like.

Responsive to a determination that 5G NR coverage is not available, the UE stays with LTE only at 606. To the extent that other coverage is determined, e.g., other LTE eNBs, and/or other WAPs, such as Wi-Fi, Bluetooth, and the like, the techniques disclosed herein can be applied to establish DC service based on a similar rating, ranking and/or preference.

Responsive to a determination that 5G NR coverage is available, a service and/or application associated with the UE is determined at 612. Services can include, without limitation, voice services, e.g., VoIP, video services, e.g., streaming video, data services, and the like. In some embodiments, the services are active or otherwise pre-established via the serving eNB. Alternatively or in addition, the services can be in a requested state, in which the UE 106 and/or a remote device/system is requesting access to any such services in association with the UE 106.

In at least some embodiments, the service are neither active nor requested. For example, the services can be identified as default services, e.g., based on a level of subscription, an equipment type, a promotion of the network operator and/or service provider, e.g., NETFLIX®, and the like. Alternatively or in addition, the services can be identified based on past performance of the particular UE 106, and/or past performance of a user and/or group of users associated with the particular UE 106. For example, if a user has used streaming video services in the past, it can be determined that the user is likely to use the same or similar services in the future. Accordingly, target eNBs can be identified in association with the UE 106 based on the current and/or past service requests.

In at least some embodiments, a service profile and/or schedule can be determined and associated with the UE 106. The service profile and/or schedule can be based on one or more of a time of day, a day of the week, a location of the UE 106, an identity of a user of the UE 106, e.g., according to presence data of the user and so on. Consider, by way of illustrative example, a commuter who routinely uses the YOUTUBE® application while commuting on a train, a bus and the like. It can be determined by one or more of a time of day, a day of the week, a location of the UE 106, and/or a presence of the user whether the user is likely to engage in YOUTUBE® services. To the extent it is determined that streaming media service is likely, regardless of whether the service is active or has been requested, the cell selector 132 (FIG. 1) and/or the ANR function 204 (FIG. 2) can determine the service and/or application at 612.

An evaluation of suitability of the identified UE service(s) for DC is performed at 614. It is understood that some services may be more well-suited for DC service than others. Namely, provisioning and/or management of DC services involves some measure of overhead. Perhaps more importantly, provisioning and/or management of DC services may result in certain available eNBs as being overlooked or otherwise not include as possible targets, e.g., in anticipation for a handover. Accordingly, by restricting the number available target eNBs to only those capable of 5G NR services, some measure of flexibility will be lost in managing handover events.

Responsive to a determination that UE service(s) is not available for DC, the UE stays with LTE only at 606. This can include DC services within LTE and/or with other WAPs, such as Wi-Fi, Bluetooth and the like.

Responsive to a determination that UE service(s) is available for DC, an indication and/or identification of an LTE-5G anchor preference, rating, and/or ranking is determined at 616. In at least some embodiments, the LTE-5G anchor preference can be determined from a neighbor relations table 134, 216, 300 (FIGS. 1-3). For example, the neighbor relations table 300 includes a column 312 identifying an LTE-5G NR DC preference value for each of the listed neighbor relations. According to the illustrative examples disclosed herein, the LTE-5G preference value can distinguish among a range of LTE-5G capable target cells and/or among those cells that are incapable of LTE-5G DC service.

It is envisioned that for at last some period of time, particular during an anticipated transition period for implementing 5G NR service, there will be at least some eNBs that are not 5G-NR capable. Accordingly, such incapable eNBs can be excluded from consideration when considering target cell(s) for a LTE-5G DC capable UE. Likewise, there may be some eNBs that are better suited than others for LTE-5G DC service. It is understood that such variability among LTE-5G DC capable eNBs can be identified by corresponding entries in column 312 identifying LTE-5G NR DC preference values associated with the different neighbor relations.

In at least some embodiments, logic and/or business rules can be determined and/or otherwise applied to identify target eNBs based on one or more of the associated LTE-5G NR DC preference value(s), the UE capability(s), the user identity and/or level of subscription, current and/or past mobile applications and/or services accessed by the UE, and the like. Accordingly, high bandwidth services, such as streaming video, may take preference when selecting target eNBs, such that "preferred" eNBs will be selected over "fallback" eNBs when both are available as neighbors.

It is further understood that any logic and/or business rules can weigh and/or otherwise combine the LTE-5G NR DC preference values 312 with other values, such as other attributes 306, 308, 310 of the neighbor relation table, and/or other considerations, such as QoS, signal strength, error performance and the like of the available LTE-5G NR DC eNBs and those neighbor cells not equipped to provide such report. Thus, it is conceivable that a neighbor cell that does not support LTE-5G NR DC can be selected over other neighbor cells that do, based on one or more of currently accessed service(s), network conditions, such as network congestion, network delay, error performance, priorities and the like.

Availability of the preferred anchor is determined at 620, e.g., based on application of one or more of the example logic and/or business rules. Responsive to a determination that the preferred anchor is not available, the UE stays with LTE only at 626. Responsive to a determination that the preferred anchor is available, LTE-5G DC is enabled between preferred anchor and the UE. In at least some embodiments, the foregoing process can continue in a looped fashion, e.g., repeating periodically and/or continuously. Repetition can be scheduled based, e.g., every few seconds, minutes, hours, and the like. Alternatively or in addition, repetition and/or looping can be event based, e.g., based on a request for service, establishment of a service, a level of activity associated with a service, network conditions, US mobility, 5G NR availability, and the like.

Families of usage scenarios include, without limitation: enhanced mobile broadband (eMBB); massive machine type communications (mMTC); and ultra-reliable and low latency communications (URLLC). Example applications and/or services can include smart home/building, voice, video, 3D video, augmented reality, education, industrial automation, mission-critical applications, e.g., e-health, transportation, e.g., self-driving cars, and the like.

By way of example, an initial LTE-5G DC setup includes a UE "camping" in an LTE cell, e.g., a serving LTE cell. The UE sets up a call and reports UE capability to the serving LTE cell. Presuming that the UE is LTE-5G NR Dual Connectivity capable, the UE moves into 5G NR coverage and reports 5G NR measurement back to the serving LTE cell. If the UE runs a DC "friendly" application, e.g., an application well suited to 5G DC, such as eMBB, the serving LTE cell employs logic and/or business rules, e.g., according to a decision tree to select an LTE anchor cell for LTE-5G DC. It is understood that the LTE anchor cell can include the serving cell, presuming it is LTE-5G capable, and/or any other neighbor cells that are LTE-5G DC capable. It is understood that the neighbor cell capability/priority to support LTE-5G DC can be dynamically updated, e.g., via X2 message exchanges or neighbor relation table updates, e.g., via an Operational Support System (OSS). During an anchor cell handover of LTE operations, the same or similar mechanism can be applied to select a target LTE anchor cell.

Figure 7:
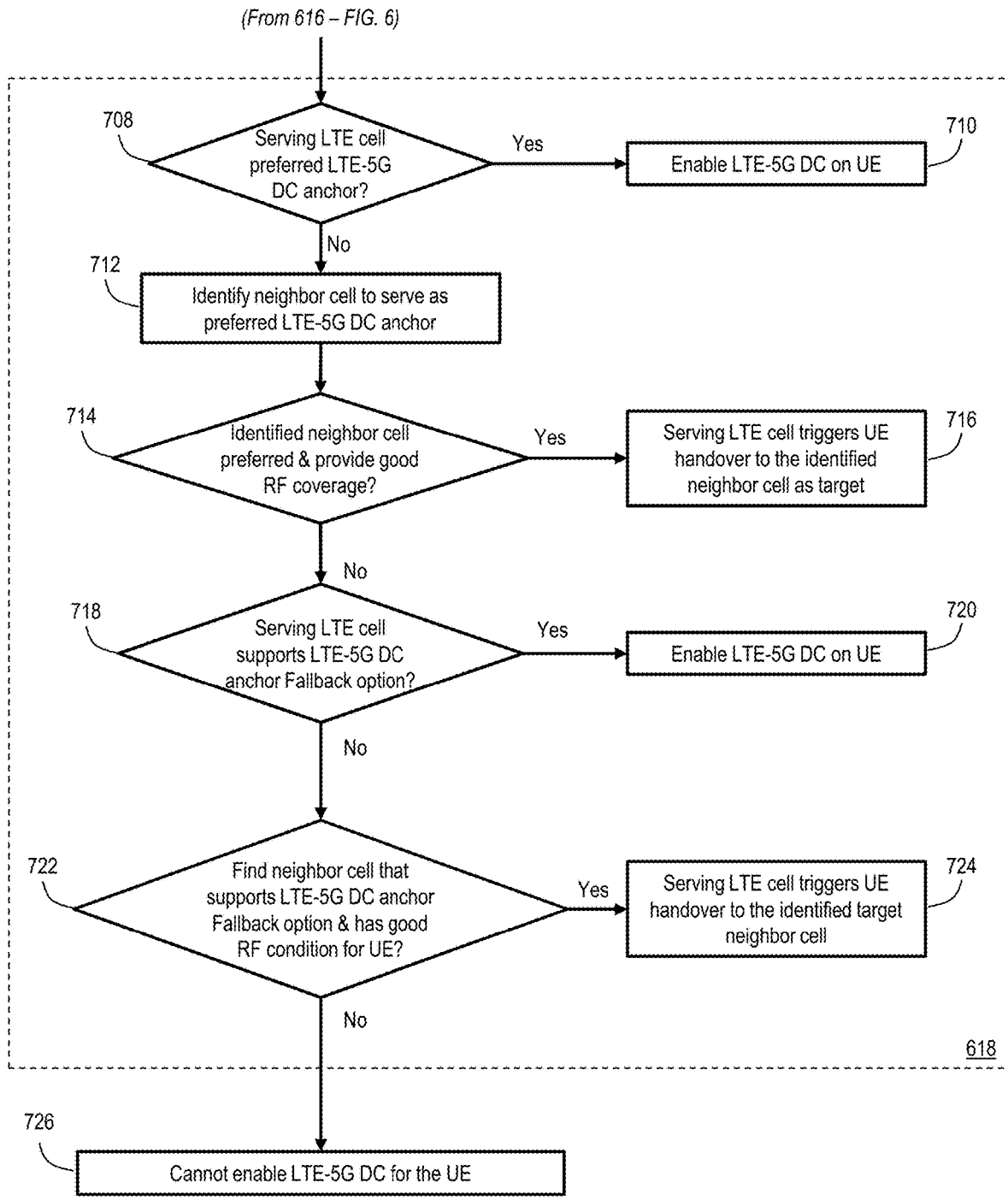

FIG. 7 depicts an illustrative embodiment of an example of a preferred anchor identification portion 618 of the process 600 used to facilitate DC service between a 3GPP LTE eNB 104 and a 5G WAP 108 (FIG. 1). According to the process 618, a determination is made at 708 as to whether the currently serving LTE cell, e.g., an eNB, has a LTE-5G DC anchor preferred attribute. As disclosed herein, the attribute can be determined by an entry in a neighbor relations table associated with the serving eNB. To the extent that the serving LTE cell is rated, ranked or otherwise identified as a preferred cell to serve as a LTE-5G DC anchor cell, LTE-5G DC is enable on the UE at 710. According to DC service, a secondary 5G cell is further identified and DC services initiated between the LTE-5G DC anchor cell and the secondary 5G cell.

Further according to the process 618, one or more neighbor cells are identified at 712 as possible DC target cells. A determination is made at 714 as to whether the identified neighbor cell(s) provides wireless coverage and is identified with a LTE-5G DC attribute as being "preferred." It is understood that the determination of wireless coverage can be made based on measurements, e.g., accomplished by the UE, by one or more other cells, and/or by other devices, e.g., other UE. Wireless coverage can be evaluated based on one or more parameters, such as signal strength, frequency and/or band, interference, error performance, e.g., bit error rate, forward error correction parameters, and the like.

To the extent that it is determined that the identified cell(s) provide favorable wireless coverage and has an LTE-DC rating of "preferred," the serving cell triggers a UE handover to the identified neighbor cell as a target cell at 716. DC services can be initiated with the target cell serving as a MeNB and a 5G WAP serving as a SgNB.

Responsive to the identified neighbor cell neither providing adequate wireless coverage nor having a preferred attribute, a determination is made at 718 as to whether the currently serving LTE cell, e.g., an eNB, has a LTE-5G DC anchor "fallback" attribute. Once again, the attribute can be determined by an entry in a neighbor relations table associated with the serving eNB. To the extent that the serving LTE cell is rated, ranked or otherwise identified as a fallback cell to serve as a LTE-5G DC anchor cell, LTE-5G DC is enable on the UE at 720. According to DC service, a secondary 5G cell is further identified and DC services initiated between the LTE-5G DC anchor cell and the secondary 5G cell.

Further according to the process 618, one or more neighbor cells are identified at 712 as possible DC target cells. A determination is made at 722 as to whether any of the identified neighbor cell(s) provide wireless coverage and are identified with a LTE-5G DC attribute as being "preferred." It is understood that the determination of wireless coverage can be made based on measurements, e.g., accomplished by the UE, by one or more other cells, and/or by other devices, e.g., other UE. Wireless coverage can be evaluated based on one or more parameters, such as signal strength, frequency and/or band, interference, error performance, e.g., bit error rate, forward error correction parameters, and the like.

To the extent that it is determined that the identified cell(s) provide favorable wireless coverage and has an LTE-DC rating of "fallback," the serving cell triggers a UE handover to the identified neighbor cell as a target cell at 721. DC services can be initiated with the target cell serving as a MeNB and a 5G WAP serving as a SgNB.

To the extent that it is determined that the identified cell(s) do not provide favorable wireless coverage and/or do not have an LTE-DC rating of "fallback," LTE-5G DC operation is not available at 726.

While for purposes of simplicity of explanation, the respective processes are shown and described as a series of blocks in FIGS. 6-7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
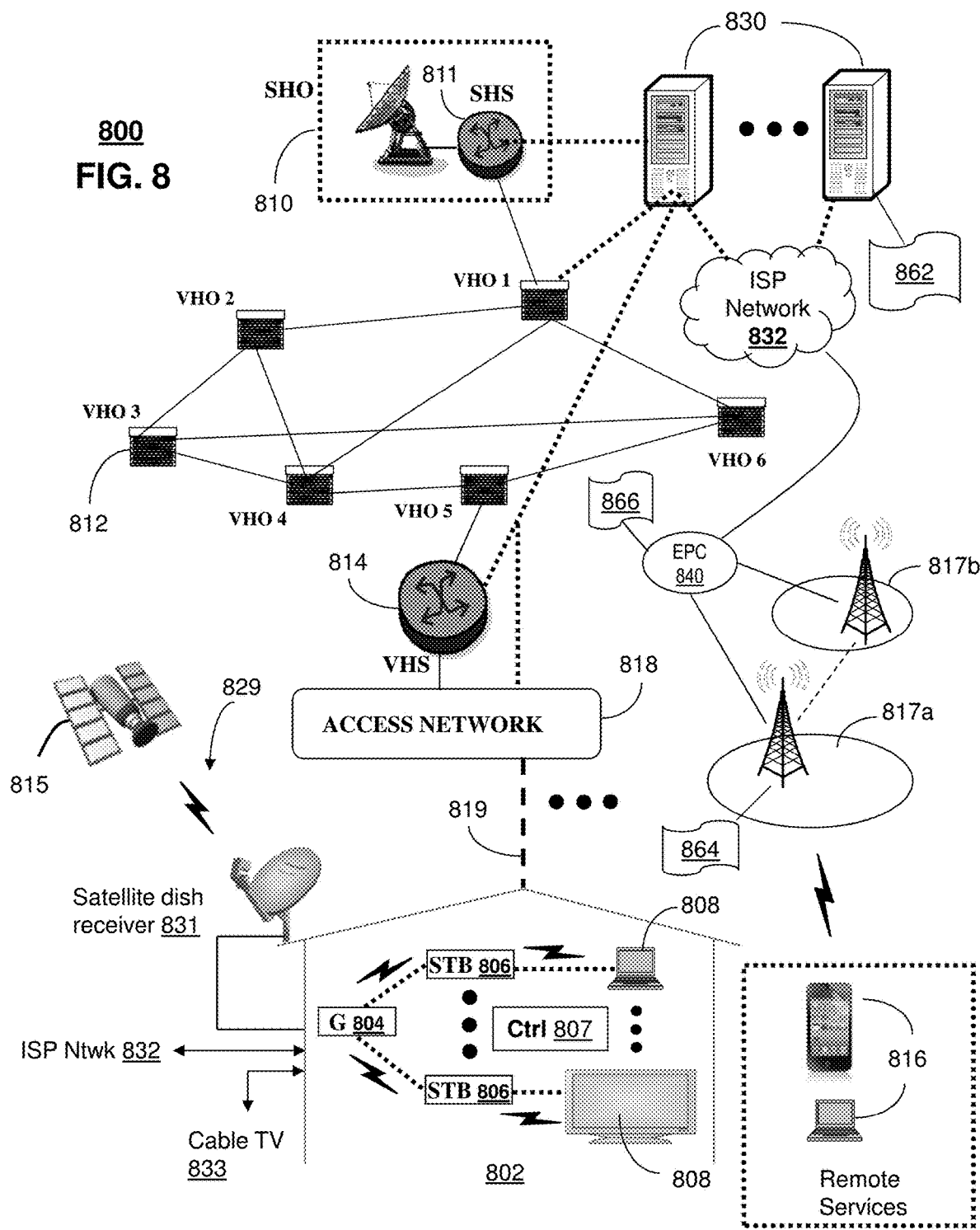
FIG. 8 depict illustrative embodiments of communication systems that provide media services in portions of the systems described in FIGS. 1-5B.

FIG. 8 depicts an illustrative embodiment of a communication system 800 for providing various communication services, such as delivering media content. The communication system 800 can represent an interactive media network, such as an interactive television system (e.g., an Internet Protocol Television (IPTV) media system). Communication system 800 can be overlaid or operably coupled with the wireless mobility communication systems of FIGS. 1-5 as another representative embodiment of communication system 800. For instance, one or more devices illustrated in the communication system 800 of FIG. 8 determines dual connectivity values for neighbor cells of a serving cell of a wireless network. A dual connectivity capability is determined of a wireless device that engages in wireless communications coordinated by the serving cell. A target cell of the neighbor cells is determined based on a dual connectivity value of the dual connectivity values. Initiation of a dual connectivity service is facilitated based on the wireless device via the target cell, wherein the target cell serves as a master cell of the dual connectivity service, and wherein the dual connectivity service includes exchanging user plane messages between the wireless device, the master cell and a secondary cell of the wireless network.

In one or more embodiments, the communication system 800 can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol. The VHS 814 can distribute multimedia broadcast content via an access network 818 to commercial and/or residential buildings 802 housing a gateway 804 (such as a residential or commercial gateway).

The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a neighbor relations manager and/or cell selection server 830. The neighbor relations manager/cell selection server 830 can use computing and communication technology to perform function 862, which can include among other things, the neighbor relations management techniques described by processes 600-700 of FIGS. 6-7. For instance, function 862 of the neighbor relations manager/cell selection server 830 can be similar to the functions described for the O&M server 306 of FIG. 3 in accordance with the processes 600-700 of FIGS. 6-7. The eNBs 817a, 817b, generally 817, and evolved packet core 840 can be provisioned with software functions 864 and 866, respectively, to utilize the services of neighbor relations manager/cell selection server 830. For instance, functions 864 and 865 of eNBs 817 and evolved packet cores 840 can be similar to the functions described for the eNBs 104, 112, 120, 204, 254 and/or evolved packet cores 130, 214 of FIGS. 1, 2A, 2B in accordance with the processes 600-700 of FIGS. 6 and 7.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
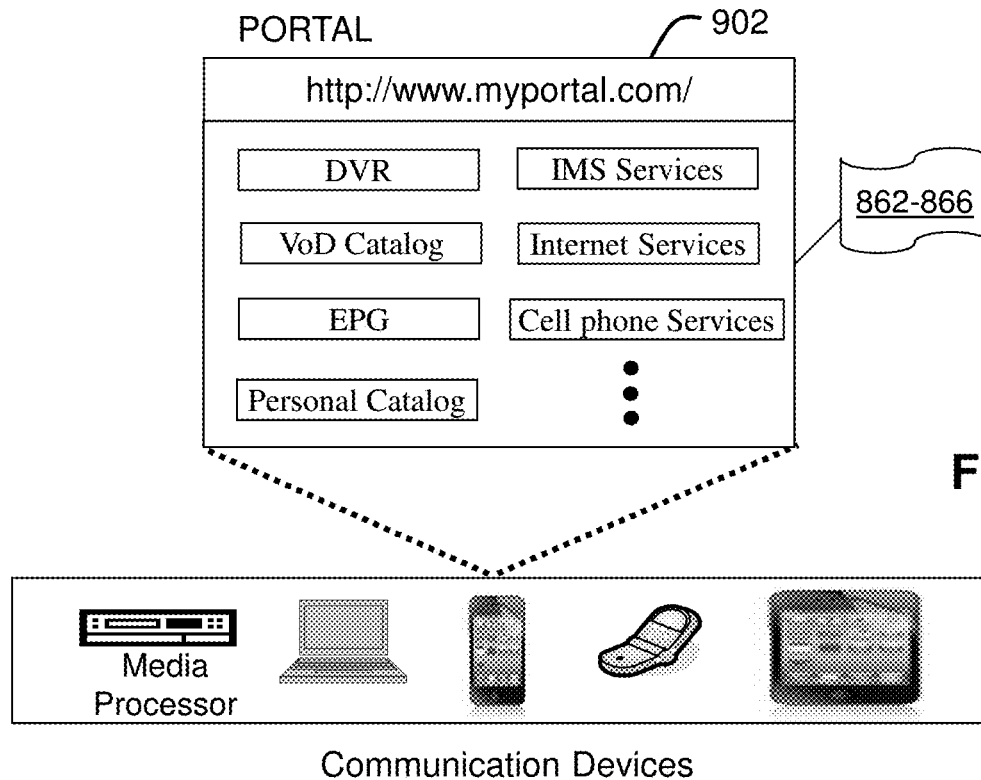
FIG. 9 depicts an illustrative embodiment of a web portal for interacting with the communication systems of the systems described in FIGS. 1-5B and 8.

FIG. 9 depicts an illustrative embodiment of a web portal 902 of a communication system 900. Communication system 900 can be overlaid or operably coupled with systems 100, 300, 500, 550 of FIGS. 1-2 and/or 5A-5B, and/or communication system 800 as another representative embodiment of systems 100, 300, 500, 550 of FIGS. 1-2 and/or 5A-5B, and/or communication system 800. The web portal 902 can be used for managing services of systems 100, 300, 500, 550 of FIGS. 1-2 and/or 5A-5B, and/or communication system 800. A web page of the web portal 902 can be accessed by a Uniform Resource Locator (URL) with an Internet browser using an Internet-capable communication device such as those described in relation to the systems 100, 300, 500, 550 of FIGS. 1-2 and/or 5A-5B, and/or communication system 800. The web portal 902 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 902 can also be used for provisioning IMS services described earlier, provisioning Internet services, provisioning cellular phone services, and so on.

The web portal 902 can further be utilized to manage and provision software applications 862-866 to adapt these applications as may be desired by subscribers and/or service providers of systems 100, 300, 500, 550 of FIGS. 1-2 and/or 5A-5B, and/or communication system 800. For instance, users of the services provided by the cell selector 134 or the neighbor relations manager/cell selection server 830 can log into their on-line accounts and provision the servers 110 or the neighbor relations manager/cell selection server 830 with logic and/or business rules, e.g., to be applied in association with the techniques disclosed herein. Alternatively or in addition, the web portal 902 can be used to update maintenance status, to enter, view and/or otherwise modify configuration parameters, e.g., including associations of LTE-5G DC attributes with one or more of the eNBs and/or 5G gNBs, and so on. Service providers can log onto an administrator account to provision, monitor and/or maintain the systems 100, 300, 500, 550 of FIGS. 1-2 and/or 5A-5B, and/or communication system 800.

Figure 10:
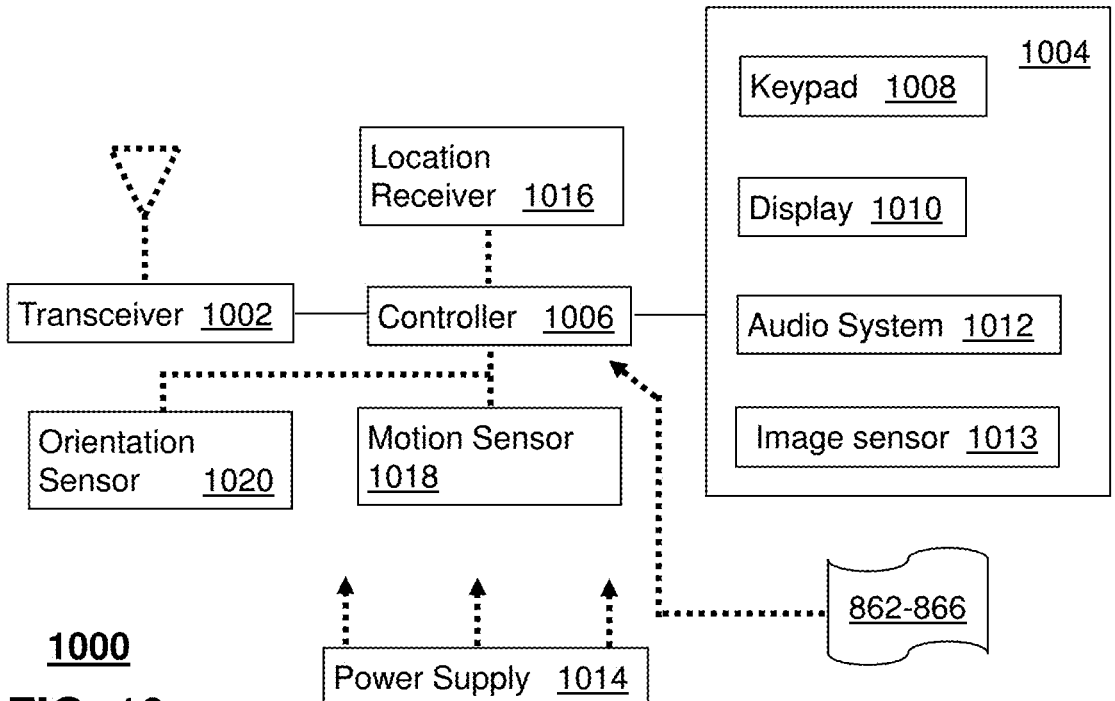
FIG. 10 depicts an illustrative embodiment of a communication device for interacting with the communication systems of the systems described in FIGS. 1-5B and 8.

FIG. 10 depicts an illustrative embodiment of a communication device 1000. Communication device 1000 can serve in whole or in part as an illustrative embodiment of the devices depicted in FIGS. 1-2 and/or 5A-5B and/or FIG. 8, and can be configured to perform portions of processes 600, 700 of FIGS. 6-7.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices of FIGS. 1-2 and/or 5A-5B, the eNB 817, the evolved packet core 840, or the neighbor relations manager/cell selection server 830 of FIG. 8, as well as the IMS CDs 801-802 and PSTN CDs 803-805 of FIG. 8. It will be appreciated that the communication device 1000 can also represent other devices that can operate in systems of FIGS. 1-2 and/or 5A-5B, communication system 800 of FIG. 8 such as a gaming console and a media player. In addition, the controller 1006 can be adapted in various embodiments to perform the functions 862-866, respectively.

Upon reviewing the aforementioned embodiments, it would be evident to an artisan with ordinary skill in the art that said embodiments can be modified, reduced, or enhanced without departing from the scope of the claims described below. For example, as 5G deployments move forward, another LTE-5G NR DC scenario is that 5G cell acts as an anchor cell. Any one or more of the various techniques disclosed herein can be extend to this scenario, e.g., by adding new attribute LTE-5G DC Preference IE to a 5G cell neighbor relation table and/or in association with a 5G-5G cell message exchange. In at least some embodiments, the various techniques disclose herein can be applied to a 5G cell-5G cell dual connectivity anchor cell selection, e.g., to improve and/or otherwise optimize a 5G anchor cell selection. Alternatively or in addition, the various techniques disclosed herein can apply to anchor cell selection when both LTE-5G DC and 5G-5G DC are possible. For example, a DC capable UE can be moved to the either an LTE anchor cell and/or a 5G anchor cell that can provide a preferred, e.g., optimal performance. Alternatively or in addition, the techniques disclosed herein can be applied to a scenario in which user data aggregation occurs in a core network portion of the mobile network. For example, the anchor cell preference can be set or otherwise established based on one or more of a carrier preference, a cell load, and the like. It is understood that the various techniques disclosed herein can be applied to dual connectivity between any type of cellular, e.g., LTE, 4G, 5G and any other type of network, e.g., Wi-Fi and/or other future technologies. In at least some embodiments, one or more of the techniques disclosed herein can be integrated with self-organizing network (SON) to provide network automation and traffic optimization. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
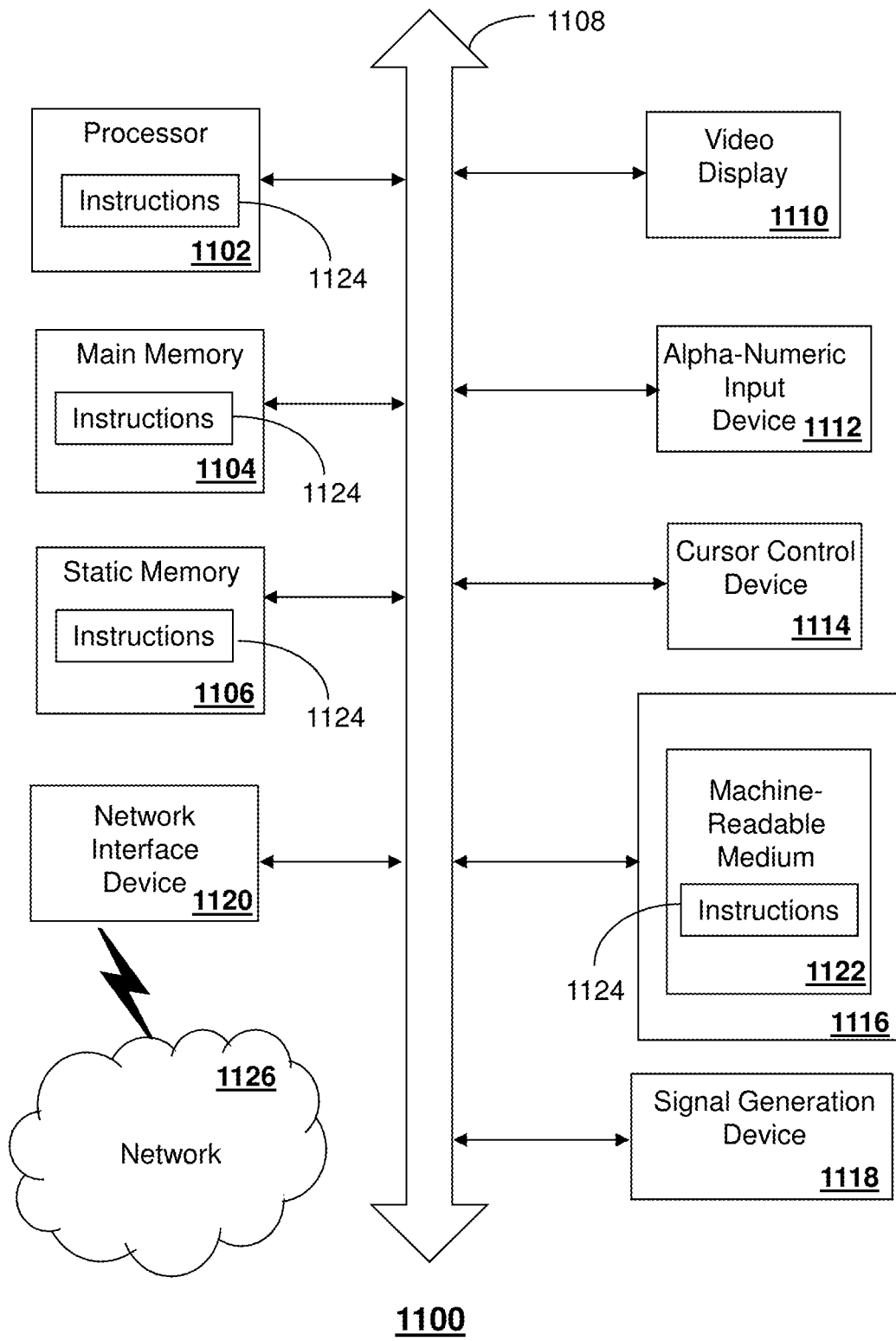
FIG. 11 is a diagrammatic representation of a machine in the form of a processing system including a process within which a set of instructions, when executed, may cause the processor to perform any one or more of the processes described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the eNB 104, 202, 406, 408, the 5G-WAP 108, the configuration server 136, the cell selector 132, elements of the core network 130, the UE 106, 201, the O&M system 206, the MeNB 504, 554, the SgNB 506, 556, the neighbor relations manager/cell selection server 830, the media processor 806 and other devices of FIGS. 1-5 and 8-10. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, Zigbee), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

It should be appreciated that the techniques disclosed herein can be used to dynamically select LTE anchor cells for LTE-5G Dual Connectivity functions by adding a new "LTE-5G NR DC Preference" IE in neighbor relation table and to an X2-AP message. It is understood that application of the disclosed techniques improves LTE-5G NR DC performance, e.g., by enabling the DC in a preferred, e.g., the best suitable LTE cell. It is understood further that application of the disclosed techniques improve network resource utilization and/or selection for DC anchor cell. Alternatively or in addition, application of the disclosed techniques reduces 5G introduction cost and/or any related impact on existing and/or planned LTE cell network resources, e.g., according to one or more processing power, backhaul requirements, and the like. Application of one or more of the various disclosed techniques can implement LTE-5G DC UE in a manner that extends and/or otherwise maximizes DC utilization and improves performance.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a processing system including a processor; and
   a memory that stores executable instructions that, when executed by the processing system, facilitate performance of operations, the operations comprising:
   ranking a plurality of neighboring cells of a mobile cellular network according to dual connectivity capability information obtained via configuration update messages, resulting in a dual connectivity ranking of the plurality of neighboring cells;
   identifying a target cell of the plurality of neighboring cells according to the dual connectivity ranking; and
   identifying a dual connectivity capability of a mobile device, wherein a dual connectivity service is initiated according to the dual connectivity ranking, and wherein the dual connectivity service comprises exchanging user plane messages between the mobile device, a master cell and a secondary cell of the mobile cellular network.

2. The system of claim 1, wherein the target cell comprises the master cell, and wherein the dual connectivity service is initiated via the target cell based on the dual connectivity capability of the mobile device.

3. The system of claim 1, wherein the operations further comprise receiving the configuration update messages from the plurality of neighboring cells.

4. The system of claim 1, wherein a neighbor relation associated with the target cell and another one of the plurality of neighboring cells includes a dual connectivity preference.

5. The system of claim 4, wherein the dual connectivity preference corresponds to one of a plurality of preference levels.

6. The system of claim 4, wherein a plurality of neighbor relations associated with the target cell and each of the other cells of the plurality of neighboring cells respectively are arranged in a neighbor relations table, and wherein the neighbor relations table is updated in accordance with the configuration update messages.

7. The system of claim 6, wherein each of the plurality of neighbor relations comprises a dual connectivity rating.

8. The system of claim 1, wherein the configuration update messages comprise a peer-to-peer message from a first evolved node B communications node to a second evolved node B communications node.

9. The system of claim 8, wherein the peer-to-peer message includes a dual connectivity preference.

10. A method comprising:
    ranking, by a processing system including a processor, a plurality of neighboring cells of a mobile cellular network according to dual connectivity capability information obtained via configuration update messages, resulting in a dual connectivity ranking of the plurality of neighboring cells; and
    identifying a dual connectivity capability of a mobile device, wherein a dual connectivity service is initiated according to the dual connectivity ranking, and wherein the dual connectivity service comprises exchanging user plane messages between the mobile device, a master cell and a secondary cell of the mobile cellular network.

11. The method of claim 10, further comprising:
    receiving, by the processing system, the configuration update messages from the plurality of neighboring cells; and
    identifying, by the processing system, a target cell of the plurality of neighboring cells according to the dual connectivity ranking.

12. The method of claim 11, wherein the target cell comprises the master cell, and wherein the dual connectivity service is initiated via the target cell based on the dual connectivity capability of the mobile device.

13. The method of claim 11, wherein a neighbor relation associated with the target cell and another one of the plurality of neighboring cells includes a dual connectivity preference.

14. The method of claim 13, wherein the dual connectivity preference corresponds to one of a plurality of preference levels.

15. The method of claim 10, wherein the configuration update messages comprise a peer-to-peer message from a first evolved node B communications node to a second evolved node B communications node.

16. A non-transitory machine-readable medium comprising executable instructions that, when executed by a processing system including a processor, facilitate performance of operations, comprising:

ranking a plurality of neighboring cells of a mobile cellular network according to dual connectivity capability information obtained via configuration update messages, resulting in a dual connectivity ranking of the plurality of neighboring cells;

identifying a target cell of the plurality of neighboring cells; and identifying a dual connectivity capability of a mobile device, wherein a dual connectivity service is initiated according to the dual connectivity ranking, and wherein the dual connectivity service comprises exchanging user plane messages between the mobile device, a master cell and a secondary cell of the mobile cellular network.

17. The non-transitory machine-readable medium of claim 16, wherein the target cell is identified according to the dual connectivity ranking, and wherein the dual connectivity service is initiated via the target cell based on the dual connectivity capability of the mobile device.

18. The non-transitory machine-readable medium of claim 16, wherein a neighbor relation associated with the target cell and another one of the plurality of neighboring cells includes a dual connectivity preference.

19. The non-transitory machine-readable medium of claim 18, wherein the dual connectivity preference corresponds to one of a plurality of preference levels.

20. The non-transitory machine-readable medium of claim 16, wherein the configuration update messages comprise a peer-to-peer message from a first evolved node B communications node to a second evolved node B communications node.

* * * * *